United States Patent

Lugo

[15] 3,690,357
[45] Sept. 12, 1972

[54] ADJUSTABLE DEPTH GROOVE CUTTER AND SUPPORT THEREFOR

[72] Inventor: Roberto Lugo, Av. Nacional 45, Panama, Panama

[22] Filed: July 7, 1970

[21] Appl. No.: 52,847

[52] U.S. Cl. ............144/232, 29/105, 143/133 M, 144/134.1, 144/234, 408/187
[51] Int. Cl. ............B27b 33/12, B27g 13/14
[58] Field of Search..144/218, 232, 234, 90.1, 134.1, 144/136; 29/105; 90/63; 408/187, 188; 143/133.3, 133.12; 83/665

[56] References Cited

UNITED STATES PATENTS

| 434,894 | 1/1890 | Thomson et al. | 29/105 X |
| 1,718,325 | 6/1929 | Weaver | 144/136 X |
| 567,135 | 6/1896 | Heald | 143/133 L |
| 536,432 | 3/1895 | Kinsey | 144/232 X |
| 559,971 | 3/1896 | Fletcher | 144/232 |

FOREIGN PATENTS OR APPLICATIONS 14,364  11/1897  Sweden .....................144/232

Primary Examiner—Andrew R. Juhasz
Assistant Examiner—James F. Coan
Attorney—Berman, Davidson and Berman

[57] ABSTRACT

An adjustable depth groove cutter and support therefor for mounting on the spindle of a shaping machine. The cutter head includes a base plate having upstanding pivot pins formed thereon. A cutter having a plurality of groove cutting teeth is mounted on each pivot pin for eccentric adjustment with respect to the axis of rotation of the cutter head. The cutting tooth arrangement on the cutting blades is such that each tooth removes a small portion of the total cut so that the cutting work is divided among all of the teeth. As the cutter blades are adjusted eccentrically outwardly the depth of the cut is increased.

3 Claims, 9 Drawing Figures

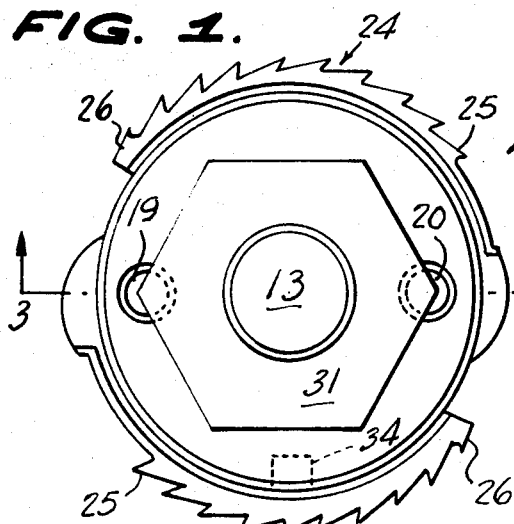
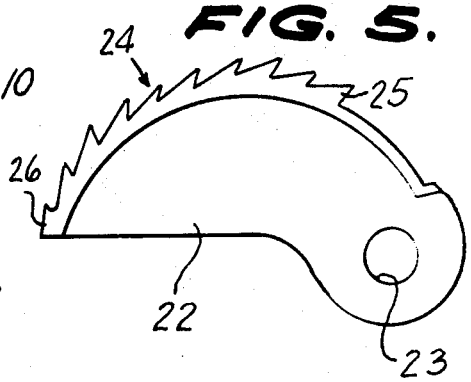
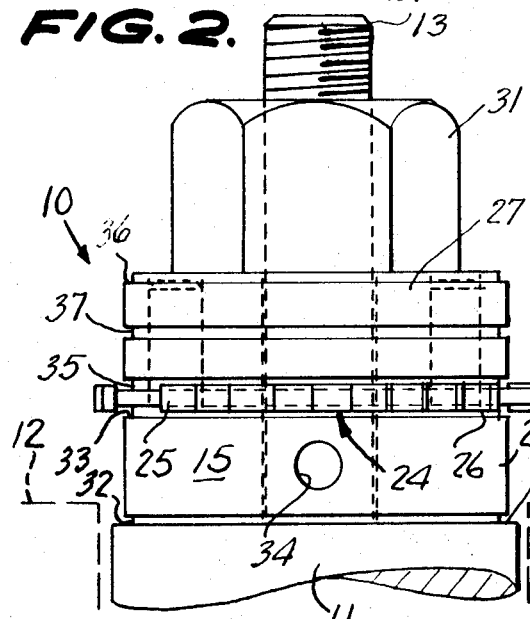
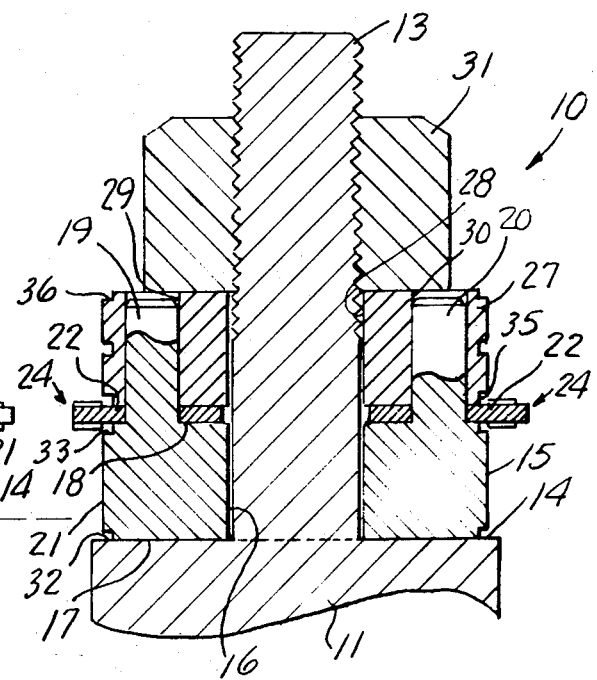
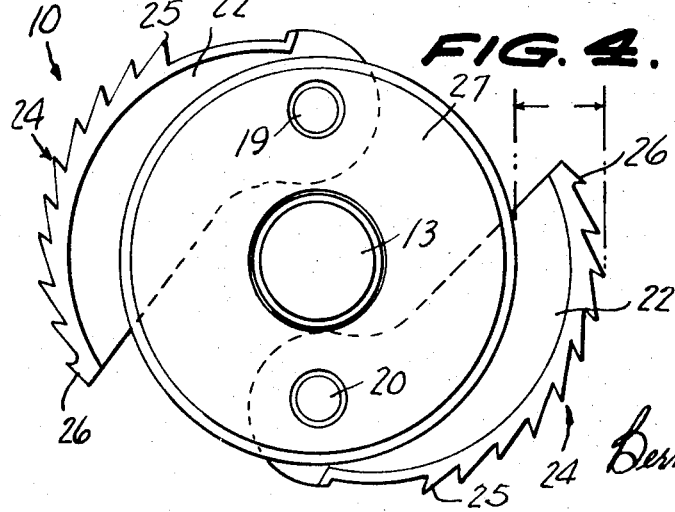

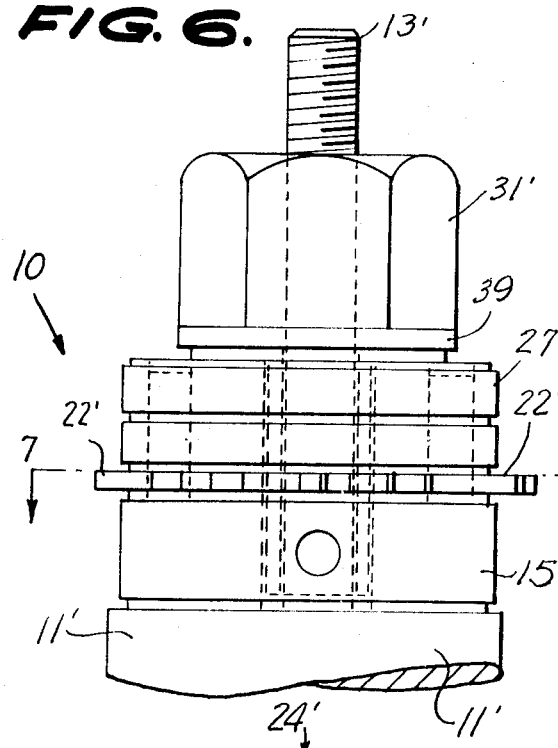
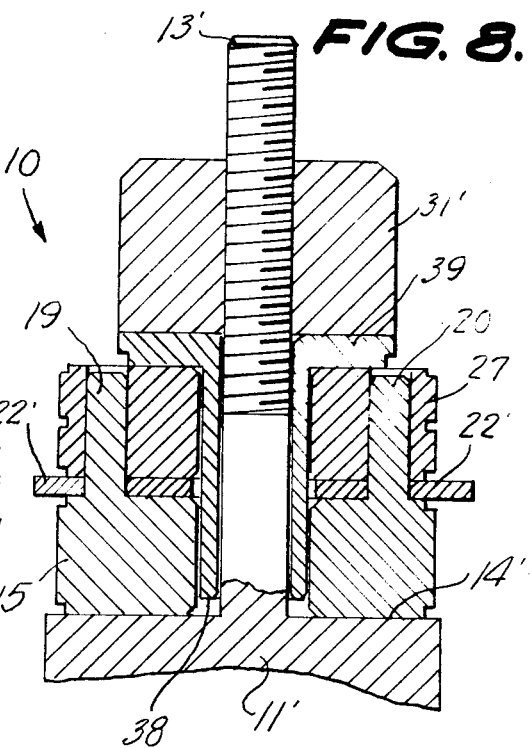
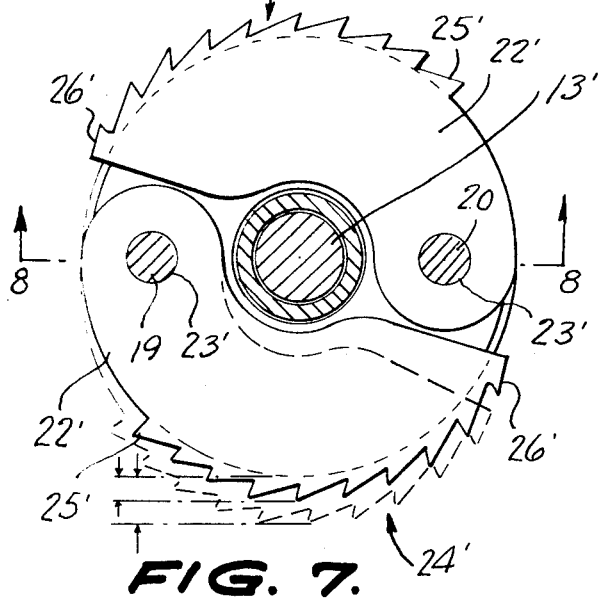
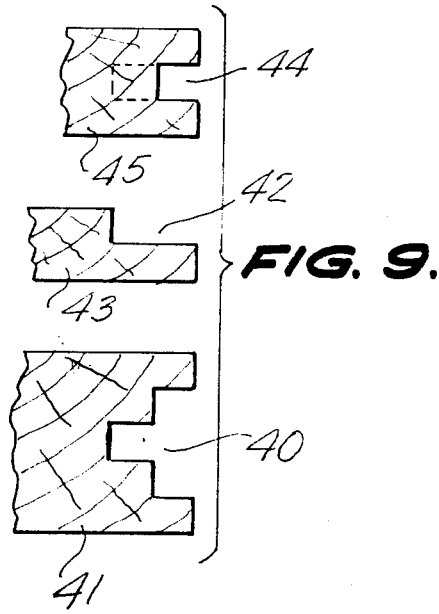

ADJUSTABLE DEPTH GROOVE CUTTER AND SUPPORT THEREFOR

BACKGROUND OF THE INVENTION

Field of the Invention

The present invention relates to a groove cutter for forming grooves in the edges of boards for various purposes such as the grooves of tongue and groove lumber.

SUMMARY OF THE INVENTION

The present invention includes a cutter head for mounting on the rotating spindle of a shaping machine to provide a groove cutter for the edges of lumber. The cutter head includes a base plate having cutter blade pivot pins extending upwardly therefrom with the pivot pins arranged on opposite sides of the center of the base plate. The cutter blades are eccentrically mounted on the pivot pins so that they can be swung outwardly to vary the depth of cut. Each of the cutter blades has a plurality of cutting teeth arranged so as to successively cut deeper into the groove with each tooth cutting a portion of the total cut.

The primary object of the invention is to provide a groove cutter head adjustable to vary the depth of cut and arranged to divide the cutting work over a plurality of teeth.

Other objects and advantages will become apparent in the following specification when considered in the light of the attached drawings.

BRIEF DESCRIPTION OF THE DRAWINGS

FIG. 1 is a top plan view of the invention;

FIG. 2 is a side elevation of the invention;

FIG. 3 is a vertical sectional view taken along the line 3—3 of FIG. 1, looking in the direction of the arrows;

FIG. 4 is a view similar to FIG. 1 showing the cutter blades in extended position and the clamping nut removed;

FIG. 5 is a top plan view of the cutter blade shown removed from the cutting head;

FIG. 6 is a side elevation with a slightly modified form of the invention;

FIG. 7 is a horizontal sectional view taken along the line 7—7 of FIG. 6, looking in the direction of the arrows;

FIG. 8 is a vertical sectional view taken along the line 8—8 of FIG. 7, looking in the direction of the arrows; and FIG. 9 is a sectional view illustrating some of the grooves cut by the cutter heads of the invention.

DESCRIPTION OF THE PREFERRED EMBODIMENTS

Referring now to the drawings in detail wherein like reference characters indicate like parts throughout the several figures the reference numeral 10 indicates generally a groove cutter head constructed in accordance with the invention.

The groove cutter head 10 is adapted for use with a conventional shaping machine of the type which includes a vertical shaft 11 which extends upwardly in a table 12 and carries a threaded spindle 13 axially projecting from the upper end thereof. The threaded spindle 13 is integrally formed with the shaft 11 and the horizontal shoulder 14 is formed at the upper end of the shaft 11 at its juncture with the spindle 13.

The cutter head 10 is mounted on the spindle 13 and includes a cylindrical base plate 15 having an axial bore 16 extending therethrough for engagement over the spindle 13. The base plate 15 has a flat bottom surface 17 which engages against the shoulder 14 and a flat top surface 18 arranged parallel to the bottom surface 17. A pair of cylindrical pins 19, 20 extend integrally upwardly from the base plate 15 in diametrically opposed relation on opposite sides of the bore 16. The pins 19, 20 are spaced inwardly from the cylindrical surface 21 of the base plate 15.

A cutter blade 22 is a generally flat plate and has a bore 23 formed therein adjacent one end thereof. The bore 23 is adapted for engagement over the pin 19 and the pin 20 to secure the cutter blades 22 to the cutter head 10. The cutter blade 22 has a plurality of teeth 24 arranged in the arc of a circle along one edge of the cutter blade 22. The teeth 24 extend from a lead tooth 25 to the end tooth 26. The teeth 24 are thicker than the plate 22 and this thickness determines the width of the groove to be cut.

A cylindrical clamp washer 27 is provided with a axial bore 28 for engagement over the spindle 13. The washer 27 has a pair of diametrically opposed bores 29, 30 extending vertical therethrough on opposite sides of the bore 28. The bores 29, 30 are arranged to receive the pins 19, 20 therein as can be seen in FIG. 3. The washer 27 engages against the cutter 22 to clamp it against the base plate 15.

A clamp nut 31 is threaded onto the spindle 13 and clamps against the washer 27 securing the cutter head 10 in position on the shaft 11.

The base plate 15 optionally may be provided with annular grooves 32, 33 at their upper and lower edges to facilitate the prying of the base plate 15 from the spindle 13 should it become jammer thereon. The base plate 15 may be further provided with an optional bore 34 entering the side wall thereof for engagement of a tool to prevent rotation of the base plate 15 when applying or removing the nut 31.

The washer 27 may be optionally provided with an annular groove 35 at its lower edge and an annular groove 36 at its upper edge. An annular groove 37 may also be provided in the washer 27 intermediate the upper and lower edges thereof with the grooves 35, 36 and 37 facilitating the removal of the washer 27 should it become jammed on the spindle 13.

Referring now to FIGS. 6 through 8 a slightly modified form of the invention is illustrated wherein the cutter head 10 is mounted on a shaft 11' forming part of a conventional shaper. The shaft 11' has a spindle 13' integrally formed on the upper end thereof and extending axially upwardly therefrom. The shaft 11' has a horizontal shoulder 14' formed at its upper end at the juncture of the shaft 11' with the lower end of the threaded spindle 13'.

The cutter head 10 includes a base plate 15 identical to the base plate 15 illustrated in FIGS. 1 through 3. A cutter blade 22' is formed of a completely flat plate and has a bore 23' formed therein adjacent one end thereof. The cutter blade 22' has a plurality of teeth 24' formed in an arcuate path along one edge thereof and extending from a lead tooth 25' to an end tooth 26'. The teeth 24' have a thickness equal to that of the cutter blade 22' and this thickness determines the thickness of the groove to be cut.

A washer 27 identical to the washer 27 illustrated in FIGS. 1 through 4 clamps the cutter blade 22' to the base plate 15. A tubular sleeve 38 is provided with an annular flange 39 on its upper end and is adapted to engage about the spindle 13' as can be seen in FIG. 8. The spindle 13' has a diameter substantially less than that of the spindle 13 and the sleeve 38 has an inner diameter such as to closely fit the spindle 13'. The outer diameter of the sleeve 38 is the same as that of the spindle 13 to center the cutter head 10 on the spindle 13'. The flange 39 engages the top of the washer 27 and a clamp nut 31' engages against the flange 39 to lock the cutter head 10 to the shaft 11'.

The cutter blade 22' can be stacked with other flat cutter blades to vary the thickness of the groove and the stacked blades may be adjusted to differing depths of cut to produce stepped grooves 40 in the lumber 41. Other cuts which can be formed with the cutter heads 10 are illustrated in FIG. 9 and include the rabbet groove 42 formed in the board 43 and the rectangular groove 44 formed in the board 45.

The cutting teeth 24 and 24' may be machined and formed so as to cut any desired shape of groove.

In the use of the invention the cutter head 10 is mounted on the spindle 13 and the cutters 22 are adjusted so that the teeth 24 are spaced equally outwardly on the oppositely disposed cutter blades 22. The position of the tooth 26 determines the total depth of the groove to be cut and each of the other teeth recede inwardly gradually from the end tooth 26 so as to take an increasing amount of the cutting work. When cutting minimum depth the lead tooth 25 (which is the strongest because it has more body material behind it) does all of the cutting since the remaining teeth 24 are no further out from the center than the lead tooth 25. As the cutter blades 22 are adjusted for a deeper cut the amount of work for each of the cutter blades 22 increases and the work is divided among all of the teeth.

The relative position of the cutting teeth with respect to the table 12 can be altered conventionally be lowing or raising the table or the shaft 11.

By combining and stacking the flat cutter blades 22' a wide variety of groove thicknesses can be produced using a very few blades.

It should be understood that the cutter blades 22, and 22' may be inverted for cutting in the opposite direction of rotation of the spindles 13, 13' respectively when the nature of the work makes this desirable.

It should be understood that each of the bores in the cutter head 10 may be internally beveled at their lower ends when desired to facilitate the engagement of the bore with the respective spindle or pin.

Having thus described the preferred embodiment of the invention it should be understood that numerous structural modifications and adaptations may be resorted to without departing from the spirit of the invention.

I claim:

1. An adjustable depth groove cutter for mounting on a rotatable spindle having a spindle nut comprising a generally cylindrical base plate having an axial bore extending therethrough for engagement over said spindle, a pair of upstanding generally cylindrical pins integrally formed on said base plate on opposite sides of said axial bore, a pair of cutter blades pivotally mounted on said pins, a washer having an axial bore extending therethrough for engagement over said spindle with said washer having a pair of diametrically opposed bores for engagement over the pins on said base plate, said washer clamping said cutter blades under pressure of the spindle nut, said spindle having a diameter substantially less than the diameter of the bores in said base plate and said washer and a sleeve mounted on said spindle to space said base plate and said washer axially thereon.

2. An adjustable depth groove cutter for mounting on a rotatable spindle having a spindle nut comprising a generally cylindrical base plate having an axial bore extending therethrough for engagement over said spindle, a pair of upstanding generally cylindrical pins integrally formed on said base plate on opposite sides of said axial bore, a pair of cutter blades pivotally mounted on said pins, a washer having an axial bore extending therethrough for engagement over said spindle with said washer having a pair of diametrically opposed bores for engagement over the pins on said base plate, said washer clamping said cutter blades under pressure of the spindle nut, said cutter blades being provided with a plurality of teeth incorporated into a serrated circular arch so that when the blades are pivoted outwards eccentricity is obtained, the tooth closer to the pivot takes a greater amount of the cutting job and each succeeding tooth takes a gradually decreasing amount of the cutting job.

3. A device as claimed in claim 2 wherein said teeth have a width substantially greater than the thickness of said cutter blade to provide a wider groove cut.

* * * * *